Figure 1:
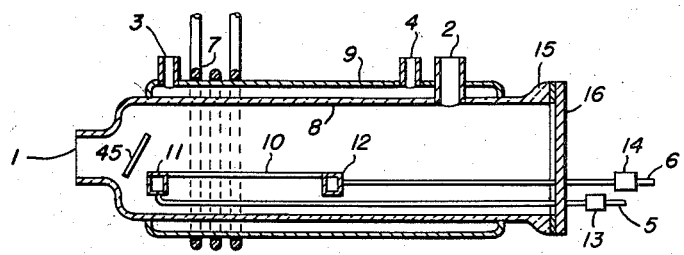

March 31, 1959     J. M. N. HANLET     2,880,117

METHOD OF MANUFACTURING SEMI-CONDUCTING MATERIALS

Filed Jan. 10, 1957

INVENTOR
JACQUES M. N. HANLET
BY Ralph B. Stewart
ATTORNEY

United States Patent Office 2,880,117
Patented Mar. 31, 1959

2,880,117

METHOD OF MANUFACTURING SEMI-CONDUCTING MATERIALS

Jacques Marie Noël Haulet, Paris, France, assignor to Societe d'Electronique et d'Automatisme, Courbevoie, France Application January 10, 1957, Serial No. 633,463

Claims priority, application France January 20, 1956

15 Claims. (Cl. 117—200)

The present invention relates to improvements in the manufacturing of semi-conducting materials suitable for use in electrical current rectifiers and amplifiers of the so-called "solid-state" kind.

An object of the invention is to provide a method of manufacturing the said semi-conductors that ensures a high degree of purification of the said materials which would make them inherently semi-conductors; however, for special purposes of the said solid-state elements, it is useful to retain and even introduce therein a very small percentage of predetermined impurities.

A further object of the invention is to provide a method of manufacturing the said semi-conducting materials which results in the production of monocrystalline structures thereof, possibly of relatively wide surfaces, and which further exhibit the N type of conductivity and is useful in the further manufacturing of the said rectifier and amplifier solid-state elements.

A further object of the invention is to provide a method of manufacturing semi-conducting materials of the IVth group of the periodic table and containing impurities in a controlled percentage of elements of the Vth group of the said periodic table classification, whereby, as known, important advantages are obtained due to the freedom of displacement of the electrical charges therein.

A typical semi-conducting material to which the invention may be applied is silicon. In such a material, the impurity which is the most difficult to eliminate is boron, and this impurity is quite objectional as being destructive of the semi-conductive properties of the silicon. Unfortunately, silicon always contains a substantial percentage of boron, as commercially available.

Conventional methods for preparing purified silicon are known which are based upon the application of heat, up to a temperature of about 550° C., to a combination of metallic zinc and silicon tetrachloride. Silicon deposits in the reaction chamber in the state of thin needles which must be thereafter ground and submitted, in this latter state, to lengthy and costly chemical treatments in view of approaching the required degree of purification. Such treatments are mainly based upon such steps as successive macerations within chlorhydric, sulphuric and nitric acids. It has been recognized that such operations do not lead to the desired result though they increase the purity of the product, and it has also been recognized that they actually are of a laboratory and not of an industrial nature. Recently a method of purification of silicon has been proposed wherein the silicon is obtained from a decomposition in a hydrogen atmosphere of silicon tetrachloride, this vapour mixture being passed over a hot filament, f.i. of tantalum, at a temperature of 1100° C. This method is said to be quite efficient for the purification of silicon but however it must be noticed that for making electrical elements therefrom, the silicon crystals thus obtained must be ground and otherwise processed and consequently are not suitable for direct use in such solid-state elements. An important drawback thereof is that the finally produced silicon can only be of the P type of conduction in the said solid-state elements.

In contradistinction therewith, the present invention provides a method of manufacturing silicon material of high efficienty with a very high degree of purification and further with a controlled percentage of impurity of materials of the Vth group which gives to the product an N-type characteristic when required, and further again the silicon will be in the shape of monocrystals of relatively wide surfaces set upon a metallic base which results in a product which can be used without any further processing in the manufacturing of solid-state rectifiers and amplifiers.

Figure 2:
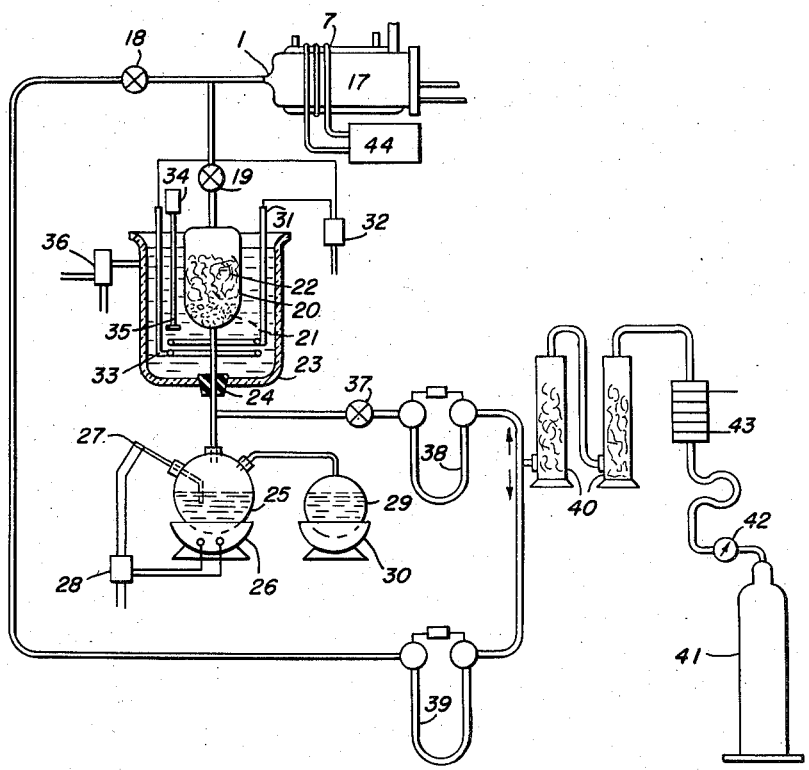

With reference to the accompanying drawings, my invention may be described as follows. Fig. 1 shows the vessel within which the semi-conductor will be obtained; and Fig. 2 shows a complete plant for practicing the said method according to the present invention.

The main part of the said plant comprises an oven constituted by a vessel 8 surrounded over the complete length thereof by a refrigerating sheath 9. From this refrigeration, the inner atmosphere of the oven 8 will be maintained at about 60° C. throughout the first step of processing.

On the left of the vessel 8, in Fig. 1, there is shown an adduction tube 1 which will admit the gas mixture produced within another part of the plant. On the right-hand end of the vessel, the oven is closed by a plate 16 by means of an air-tight joint 15. Through the said plate 16 are passed two large copper tubes 5 and 6. These copper tubes will act both as electrical leads for the heating of a tantalum tape 10 and as guides for a cooling fluid for the refrigeration of the connections 11 and 12 of this tape. The electrical taps are shown at 13 and 14 on the said tubes 5 and 6.

A deflector 45 is shown in front of the adduction pipe 1 within the oven in order that the gas mixture incoming through this pipe is evenly distributed within that part of the vessel which contains the tantalum tape 10. It must be noted that such a tape can have a transverse width as great as three to five centimeters for instance and its length may be as great as will be accommodated by the oven. The processing to be described will result in the formation on tape 10 of a monocrystal of silicon of the same useful surface or area as the tape.

A copper wire winding 7 is wound around the sheath 9 and forms a high frequency induction oven proper. The generator therefor is shown at 4 in Fig. 2 of the drawings. The span of the said high frequency winding 7 is relatively small with respect to the length of the sheath and, through mechanical means not shown, the winding 7 can be moved along and coaxially to the said sheath at a speed of about 15 millimeters per minute in the example given herein.

The cooling may be made by circulation of water from an inlet 3 to an outlet 4 within the sheath 9. The vessel 8 is provided at 2 with an outlet orfice.

The unit shown in Fig. 1 bears the numerical reference 17 in the plant or system of Fig. 2. Two sluice-gates or valves 18 and 19 are provided for isolating the said unit 17 from the remaining part of the plant when required.

The plant comprises a generator of silicon tetrachloride, the bulb 29 of which is of considerable volume as the plant must be able to operate without any communication with the outside during important periods of time. This bulb 29 is provided with an adjustable and separate heater 30, however this heating is not regulated during the operative periods thereof.

The silicon tetrachloride gas will be supplied from a separate generator 25 provided with a regulated heater 26. The temperature regulation may be made by means of an electrical contact thermometer 27 actuating a supply relay 28 for the said heater 26. The silicon tetrachloride gas is passed through a filtering unit 20 through an airtight seal 24. Within the said unit 20 are arranged pumice-stone at 21 and glass fibers at 22. Within the said unit, the pressure is equalized by means of a constant supply feeder 38 (capillary feeder head for instance) which admits hydrogen into the filtering unit vessel 20. At 37 is shown the gate or valve for such a supply of hydrogen.

The vessel 23 which surrounds the filtering vessel 20 is fed at a constant level from the constant head feeder 36 with a liquid which is heated to 20° C.±.5° C. higher than the temperature of 25. For instance a thermometer 31 controls the heater head 32 which electrically heats the liquid through the winding 33. The waterbath is continuously mixed through a mixer 35 driven by a motor 34.

41 is a hydrogen generator which through a catalyser 43 feeds a pair of cascaded dessicators 40, for instance. The output of the said dessicators is fed through the two constant-heads 38 and 39 towards the gates 37 and 18 respectively, i.e. towards the filtering unit 20 and the inlet pipe 1 for the oven unit 17.

Oxygen and nitrogen are strictly excluded from the plant. The useful reaction therein is based upon the fundamental properties of nascent hydrogen which reduces all metallic materials and also the halides according to the temperature thereof. It is from the contact with hydrogen that silicon tetrachloride will be dissociated within the vessel 8. As known, such a reaction may occur from a somewhat low temperature point. However, and according to the invention, special provisions are to be made in this respect, with due consideration of the fact that the required result is the obtention of silicon which is totally deprived of impurities, and mainly of boron. It is the boron contained within the silicon which gives to the semi-conductor the unwanted P-type characteristic of conductivity. This is observed as soon as, within "purified" silicon, there exists one atom of boron per 5,000 atoms of silicon. And further it is well-known that impurities of any of the materials of the IIIrd group of the classification of the elements will lead to such type of conduction, whereas certain impurities of the Vth group of the said classification would lead to the N type of conduction, when and if suitably proportioned within the silicon. Such considerations could be developed at will but it is estimated that the present state of the technique gives a quite plain appreciation of the advantage of the invention as it will result in actually purified silicon, in an industrial way, and further when required, in actually N-type silicon.

All traces of oxygen within the plant are eliminated by means of the pre-induction of hydrogen within the vessel 8 through the adduction 39—18—1, before the suitable temperature is reached for the tantalum tape 10. This temperature will not be lower than 1300° C. according to one special feature of the invention. It is known that the silicon tetrachloride would be dissociated, if wanted, at a temperature from 850° C. but at such temperatures lower than 1300° C. the deposit of silicon would not be free of impurities. It must be noted here that, by providing a strong cooling of the wall of the vessel 8 during this step of deposition of silicon over the tantalum tape, it is possible to form vessel 8 of such translucent material as Pyrex glass or similar material. Consequently, the control and adjustment of the temperature of the tantalum tape prior to the admission of the silicon tetrachloride can be made from optical observation of the tape.

If nitrogen were present within the vessel 8 at a temperature of 1300° C. of the tantalum tape, a reaction would occur and give a nitride of silicon over the tape. This is why nitrogen is eliminated throughout the plant, as previously said, by the introduction of hydrogen prior to the heating of the tantalum tape.

The reasons for the choice of tantalum as a base for the reception of the dissociated silicon are many. For the present time, it will be sufficient to note that tantalum does not react upon silicon, is quite unaffected by alkaline metal vapours which could casually exist in the tetrachloride gas at the temperature of melting of the silicon, the melting temperature of the tantalum, 2850° C. being quite above that of the silicon, 1420° C.

Referring back to the process proper, the gate 18 will be first open to admit within the vessel 8 an amount of hydrogen sufficient for the complete saturation thereby of the tantalum tape, at the operative temperature of 1300° C. This is important as the tantalum, at this temperature, absorbs hydrogen up to .4% in weight, viz 470 times the own volume thereof. Then the tetrachloride gas is admitted together with the hydrogen and will be dissociated upon contact with the tantalum. The speed of dissociation is very high at such a temperature, sixth times speed of dissociation at 1000° C. Consequently forty seconds will be sufficient for obtaining over the tantalum tape a layer of silicon having a thickness of about 21,000 atoms, viz 4.9 microns. The boron will be completely changed into vapour at the said temperature, since this element begins to vaporize at 1200° C. Further, the same temperature enables the dissociation of iron and silicon.

Summarising this first operative step, hydrogen is first admitted through 18 for clearing the vessel 8 of the preceding atmosphere therein. This clearance may be verified when a non-explosive combustion is obtained at the outlet 2. The electrical current is then applied to the tantalum tape 10 and the hydrogen input through 18 is controlled until the operative temperature of the tape is reached. Gate 19 is then opened for an input substantially equal to 1.5 to 2 litres per minute whilst the input from 18 is reduced back to .5 litre per minute for instance. The temperature of the silicon tetrachloride gas at 25 was adjusted to a predetermined value. The rate of deposition of the silicon over the tape is a linear function of the said temperature value and, consequently the duration of the operation will determine the thickness of the layer of silicon which it is required to obtain. Such a simple control is important in view of the establishment of solid-state elements operative at predetermined frequencies. Once the required thickness is obtained, the heaters may be stopped, at least reduced, and the hydrogen input through valve 18 may be reduced for instance to about .1 litre per minute. The second step of operation may then proceed.

This second step includes firstly increasing the electrical current through the heating winding 7 to increase the temperature of tape 10 up to 2,170° C. It is thought preferable to provide a slow increase of temperature from 1900° C. to 2170° C. in order to ensure a temperature gradient higher within the silicon than within the tantalum tape, as the resistivity of silicon changes rapidly at this condition and in a direction opposite to that of tantalum the internal resistance of which increases with the temperature. It must be noted however that silicon and tantalum present substantially equal temperature coefficients of expansion so that substantially no risk of mechanical damage is encounted during the said operative step. When this temperature of 2170° C. is established, that is to say the temperature at which silicon crystallises, the winding 7 is set in motion and moved coaxially to the oven at a speed not higher than 17 millimetres per minute as for a faster speed there would be a risk of dislocation of the crystalline structure of silicon.

The high frequency power useful for this step is quite reasonable and a power equal to about .5 kilowatt at an oscillating frequency lower than one mc./s. will be sufficient for the crystallisation in the case of a tantalum tape of three to five centimeters of width coated with a layer of silicon of at least 5 microns of thickness. This is because tantalum is a quite good conductor through which the lines of the heating field will easily close.

When a monocrystal of pure silicon is wanted, the speed of the winding will be adjusted to about 15 millimeters per minute. As known, tantalum and silicon have quite close values of atomic radii and crystals of substantially equal sizes, shapes and structures. Consequently during this step the tantalum crystals will act as "seeds" for the crystallisation of silicon. The recombination time of the charge carriers in silicon will be quite low, thus enabling the formation of a monocrystalline layer of large area, due to the fact that the difference between the coefficients of expansion of tantalum and silicon, though too small to be a nuisance, will produce during the crystallisation process a strain orientated along the main axis of the crystal during its formation period. With the above said temperature of 2170° C., the monocrystal of silicon will have the 111 axis orientated along the tantalum tape. If the process is applied with a temperature of about 2,250° C. which is quite feasible, the direction 111 and 100 of the silicon crystal will be along the axis of the tape.

For obtaining a diffusion of atoms of tantalum within the silicon crystal, for obtaining silicon of the N-type of conduction, it is provided to drive the heating winding 7 at a speed lower than 15 millimetres per minute. A mere adjustment of this speed will enable the operator to adjust the said diffusion which is quite a simple method of control of the formation of this type of silicon crystals.

What is claimed is:

1. A method of manufacturing a semi-conducting material which comprises heating a metallic plate to a temperature of 1300° C. in an atmosphere containing hydrogen and silicon tetrachloride until a layer of silicon of the desired thickness is deposited upon said plate, raising the temperature of said layer and plate to at least 2170° C., and thereafter cooling said plate and layer at a sufficiently low rate to convert said layer into a monocrystal.

2. A method according to claim 1 and wherein the said base plate is made of a tantalum tape and wherein further hydrogen is suppied to the said tape during the previous heating thereof up to the said temperature prior to the introduction of the said tetrachloride within the vessel containing the said tantalum tape and hydrogen atmosphere.

3. A method according to claim 1 and wherein the step of converting the semi-conducting layer into a monocrystal is made by heating the complex constituted by the said layer and the base plate thereof through a high frequency heating at a temperature of a value at least equal to the temperature of crystallisation of the said semi-conductor.

4. A method according to claim 3 and wherein the base plate is in the shape of an elongated tape, the said heating is processed by displacing a heating winding at a slow speed around the elongated vessel containing the said plate and the semi-conducting layer deposited thereon.

5. A method according to claim 4 and wherein the said hydrogen atmosphere is preserved throughout the said second step of operation.

6. A method according to claim 4 and wherein the speed of displacement of the said winding is so adjusted as to ensure a diffusion of some atoms of the material of the base plate within the monocrystal of the said semi-conductor.

7. A method according to claim 6 and wherein the semi-conducting layer is made of purified silicon over a tantalum base tape, and wherein the temperature of crystallisation is made equal to 2170° C.

8. A method according to claim 7 and wherein the said temperature is raised up to 2250° C. at least.

9. A method according to claim 5 and wherein the speed of displacement is made substantially equal to fifteen millimetres per minute and wherein the semi-conductor is silicon over a tantalum tape.

10. A method according to claim 6 and wherein the speed of displacement is made lower than fifteen millimetres per minute, the semi-conductor being silicon over a tantalum tape.

11. A monocrystal of silicon formed over a tantalum tape according to a method as claimed in claim 9.

12. A monocrystal of silicon formed over a tantalum tape according to a method as claimed in claim 10.

13. A method of producing a layer of semi-conducting silicon upon a metallic strip of tantalum which comprises heating said strip at a temperature of 1300° C. in an atmosphere of hydrogen until said strip is saturated with hydrogen, introducing silicon tetrachloride into said hydrogen atmosphere and maintaining said strip at said temperature until a layer of silicon of the desired thickness is deposited on said strip, discontinuing the supply of silicon tetrachloride while continuing the supply of hydrogen, heating a narrow zone of said strip to a temperature of at least 2170° C., and moving the zone of elevated temperature along said strip into the desired direction of crystal orientation and at a rate not exceeding 17 mm. per minute.

14. A method according to claim 13 wherein the rate of movement in the narrow zone of elevated temperature is less than 15 mm. per minute whereby said silicon layer is of the N-type of conductivity.

15. A method according to claim 13 wherein said zone heating is produced by a high-frequency electric field acting upon said metallic strip, and said heating zone is moved along said strip by moving said electric field along said strip.

References Cited in the file of this patent

UNITED STATES PATENTS

| | | |
|---|---|---|
| 2,438,892 | Becker | Apr. 6, 1948 |
| 2,685,728 | Ohl | Aug. 10, 1954 |